Oct. 24, 1944.  A. M. STONER  2,360,908
COLLET CHUCK
Filed Jan. 9, 1943
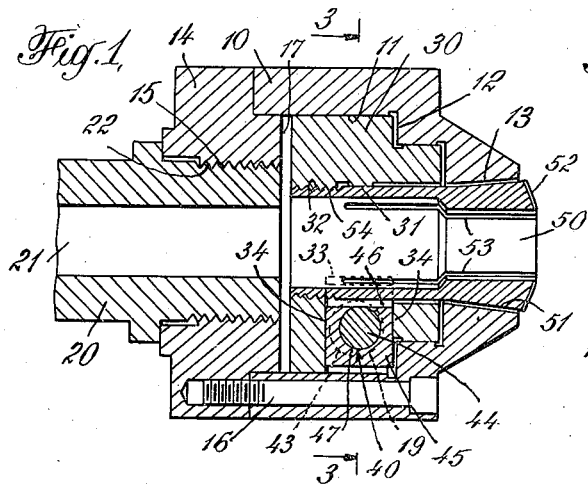
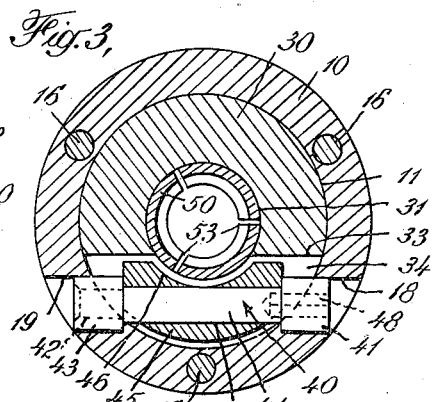
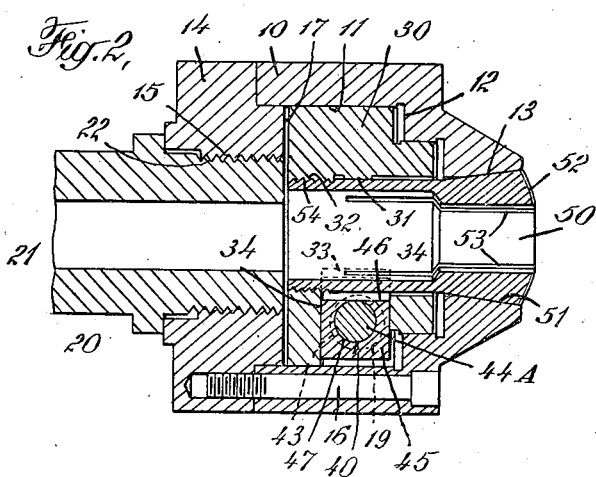
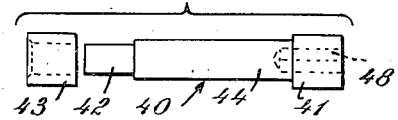
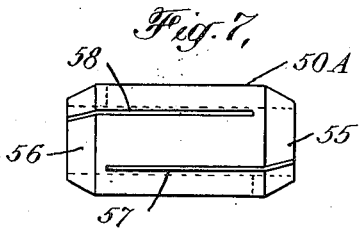
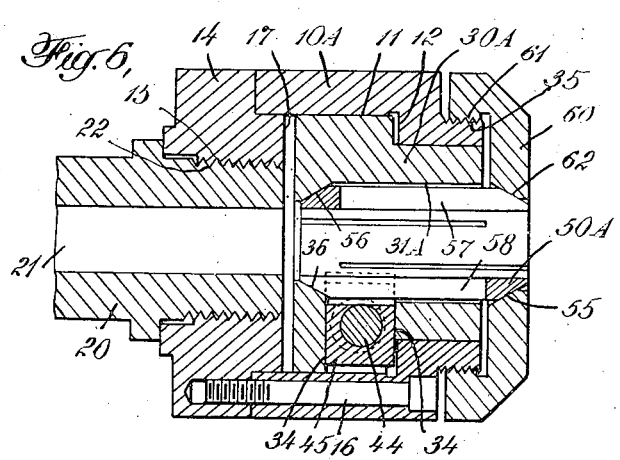
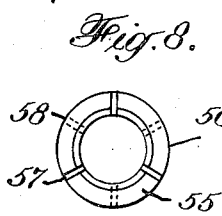
INVENTOR
Arthur Merrick Stoner
BY
E. W. Marshall
ATTORNEY Patented Oct. 24, 1944

2,360,908

UNITED STATES PATENT OFFICE 2,360,908

COLLET CHUCK

Arthur Merrick Stoner, West Hartford, Conn., assignor to The Jacobs Manufacturing Company, Hartford, Conn., a corporation of Connecticut Application January 9, 1943, Serial No. 471,827

11 Claims. (Cl. 279—51)

This invention relates to a collet chuck. Its object is to provide a simple and inexpensive construction by which the collet may be moved into a slidable block by hand into preliminary engagement with a tool or other article and may then be tightened upon the article by imparting a further longitudinal movement to the slidable block and the collet by an eccentric mechanism. Another object of the invention is to provide a chuck of this type which is open from end to end so that long articles may be passed through it. By means of my novel arrangement a single collet may be used to engage tools with shanks which vary considerably in diameter. Another advantage of this invention is that all adjustment of its parts is made from the front of the chuck and without removing it from the machine tool upon which it is mounted.

These and other objects will appear from the following specification in which I will describe the invention, the novel features of which will be pointed out in appended claims.

This application is a continuation in part of my application Serial No. 434,899, filed March 16, 1942.

In the drawing:

Figure 1 is a sectional side elevation of a chuck which is made according to and embodies my invention;

Fig. 2 is a similar view showing some of the parts in different relative positions;

Fig. 3 is a sectional end elevation of the chuck shown in the preceding figures, the section being taken on the line 3—3 of Fig. 1;

Fig. 4 is an elevation of a transverse pin and bushing shown separated from each other;

Fig. 5 is an end view of the parts shown in Fig. 4;

Fig. 6 is a sectional elevation of a chuck of modified construction which also embodies my invention;

Fig. 7 is a side elevation of the double ended collet shown in Fig. 6, and

Fig. 8 is an end view of the collet shown in Fig. 7.

10 is the body of the chuck. It has a cylindrical bore 11 which terminates in a transverse shoulder 12. 13 is a central tapered bore through the front end of the body. Suitable means are provided for attaching the body 10 to a driven part of a machine tool and in the particular form selected for illustrative purposes a collar 14, internally threaded as at 15 is shown on the rear end of the body and held thereon by bolts 16. This collar has an inner transverse face 17.

20 designates the spindle of a lathe, drill press or other machine tool. This spindle has a central bore 21 and external threads 22 which engage the threads in the collar 15.

30 designates a block slidably mounted in the cylindrical bore 11 of the body 10 between the shoulder 12 and the inner face 17 of the collar 15. This block has a central longitudinal bore 31, the inner end of which is threaded, as at 32. A transverse slot 33 having flat parallel sides 34 is cut across one side of the block 30.

40 is a pin normal to and offset from the axis of the body which restrains the block 30 from rotating within the body 10 and is also arranged to impart longitudinal movement to the block. This pin has a circular head 41 which is rotatively seated in a circular opening 18 in the body. The opposite end portion 42 of the pin is of restricted diameter and fits a circular bushing 43, the outer diameter of which is preferably the same as that of the head 41 and is arranged to be seated in a circular opening 19 in the body. The head 41, bushing 43 and the openings 18 and 19 are all in axial alinement. The intermediate portion 44 of the pin between the head 41 and the bushing 43 is circular in cross-section, but its axis is offset from the axis of the head and bushing. Its diameter is less than that of the head and the bushing and greater than that of the reduced end portion 42.

45 is a cross head in the slot 33 in the block 30 fitting its sides 34 and slidable radially therein. The cross head is cut away, as at 46 to clear the bore 31. The intermediate part 44 of the transverse pin 40 passes through a hole 47 in the cross head and forms a rotative fit therewith.

These parts are assembled by passing the pin through one side of the body, through the hole 47 in the cross head and into the opening 18 in the body. The bushing 43 is then placed on the restricted end 42 of the pin into its seat 19 in the body, after which the end of the pin is riveted over the adjacent part of the bushing, as shown in Fig. 3.

A polygonal sided recess 48 is formed in the head 41 of the pin for the reception of a wrench by means of which the pin may be rotated. When the pin is rotated, the axis of the intermediate portion of it will rotate around the axis of the head 41 and the bushing 43 and will impart a radial reciprocation to the cross head and also a longitudinal reciprocation to both the cross head and the block 30.

50 is a collet in the form of a hollow tube having an enlarged conical outer end 51 which fits the tapered bore 13 in the forward end of the body. This outer end of the collet is knurled or roughened, as at 52, to facilitate its manual rotation. It is also made with longitudinal slots 53 to provide for its contraction in the usual manner. The inner end of the collet is threaded at 54 to fit the threads 32 in the block.

In operation, the pin 40 is rotated to bring its portion 44 into the position in which it is shown in Fig. 1 which moves the block 30 as far as it can go toward the front of the chuck with its forward end near the shoulder 12 of the body 10. Then with a collet in place with its threads 54 started into engagement with the threads 32, a desired article is inserted in the collet. This article may be the shank of a tool or it may be a long rod which passes entirely through the chuck and into or through the spindle 20 of the machine tool.

The collet is then screwed into the slidable block by hand by the operator grasping its knurled end 52. This will contract the end of the collet and bring it into contact with the article. Then a wrench is inserted in the socket 48 in the head of the pin 40 and the pin rotated toward the position in which its eccentric portion is shown at 44A in Fig. 2. This moves the slidable block and the collet inwardly and causes the end of the collet to be forced with great pressure against the article in it.

In Fig. 6 the forward end of the body 10A is extended and externally threaded, as at 35. The inner end of the bore 31A in the block 30A is tapered to form a conical surface 36.

60 is a cap internally threaded as at 61 to fit the threads 35 on the forward end of the body 10A. This cap has a tapered bore 62 corresponding to the bore 36 but tapered in the opposite direction.

50A is a collet within the collar 30A having oppositely tapered ends 55 and 56 adapted to be engaged by the tapered surfaces 62 and 36 respectively. Longitudinal slots 57 extend inwardly from the front end of the collet between which are slots 58 which extend from its rear end.

In this form of the invention the preliminary engagement of the tool or article is made by screwing up the cap 60 to squeeze the opposite ends of the collet between the tapered surfaces 36 and 62. The final compression is made by turning the eccentric pin to move the block 30A toward the cap 60. This form of collet has the advantage of uniform compression throughout its length.

I have shown and described several devices which embody this invention for illustrative purposes, but it is obvious that many structural modifications can be made without departing from the spirit and scope. For this reason I intend no limitations other than those imposed by the appended claims.

What I claim is:

1. A collet chuck comprising a hollow body with a tapered orifice at its forward end, means for attaching the body to a machine tool, a drawback block longitudinally slidable in said body, said block having a longitudinal bore passing therethrough, a collet in the bore of the block having a tapered outer surface, threaded means for manually moving the position of the collet in the block, and a rotative pin passing transversely through the body and the block offset from the axis of the body and the block to clear the longitudinal bore in the block, said pin having a portion eccentric to its axis of rotation, and being provided with means to facilitate its rotation.

2. A collet chuck comprising a hollow body with a tapered orifice at its forward end, means for attaching the body to a machine tool, a drawback block longitudinally slidable in said body, said block having a longitudinal bore passing therethrough, a slot in said block extending laterally from one side of the bore therein, said slot having flat sides normal to the axis of the bore in the block, a collet in the bore of the block having a tapered outer surface threaded means for manually moving the position of the collet in the block, a cross head slidably fitted in the slot in said block, a transverse cylindrical bore in said cross head normal to the bore in the drawback block, and a rotative pin passing transversely through the body and the cross head, offset from the axis of the body of the block to clear the longitudinal bore in the block said pin having a portion eccentric to its axis of rotation, and being provided with means to facilitate its rotation.

3. A collet chuck comprising a hollow body with a tapered orifice at its forward end, means for attaching the body to a machine tool, a drawback block longitudinally slidable in said body, said drawback block having threads and a longitudinal bore passing therethrough, a slot in the drawback block extending laterally from one side of the bore therein, said slot having flat sides normal to the axis of the bore in the drawback block, a collet in the bore of the drawback block provided with threads adapted to fit the threads on the drawback block, and an enlarged conical head arranged to be brought into coactive engagement with the tapered orifice in the end of the body, means for manually rotating the collet to adjust the position of the collet in the drawback block, a cross head slidably fitted in the slot in the drawback block, a cylindrical bore in said cross head normal to the bore in the drawback block, and a rotative pin passing transversely through the body and the cross head offset from the axis of the body of the block to clear the longitudinal bore in the block and fitting the bore in said cross head, said pin having a portion eccentric to its axis of rotation, and being provided with means to facilitate its rotation.

4. A collet chuck comprising a hollow body with a tapered orifice at its forward end, means for attaching the body to a machine tool, a drawback block longitudinally slidable in said body, said drawback block having threads and having a longitudinal bore passing therethrough, a slot in the drawback block extending laterally from one side of the bore therein, said slot having flat sides normal to the axis of the bore in said drawback block, a tubular collet in the bore of the drawback block provided with threads adapted to fit the threads on the drawback block, and an enlarged conical head at the front end of the collet arranged to be brought into coactive engagement with the tapered orifice in the end of the body, means for manually rotating the collet to adjust the position of the collet in the drawback block, a cross head slidably fitted in the slot in the drawback block, a cylindrical bore in said cross head normal to the bore in the drawback block, a rotative pin passing transversely through the body and the cross head offset from the axis of the body and the block to clear the longitudinal bore in the block, said pin having circular end portions in circular openings formed on opposite sides of the body and an intermediate eccentric portion passing through and fitting the bore in the cross head, and being provided with means to facilitate its rotation.

5. A collet chuck comprising a hollow body with a tapered orifice at its forward end, means for attaching the body to a machine tool, a drawback block longitudinally slidable in said body, said drawback block having a longitudinal bore passing therethrough and being constructed with a slot extending laterally from one side of the bore therein and having a flat side normal to the axis of the body, a collet in the bore of the drawback block having an enlarged conical head at its forward end arranged to engage the tapered orifice in the end of the body, threaded means for manually moving the position of the collet in the drawback block, a cross head slidable on said flat side of the opening in the drawback block, a rotative pin passing transversely through the body and the cross head, offset from the axis of the body and the block to clear the longitudinal bore in the block said pin having end portions eccentric to its axis of rotation seated in circular openings in the body, and being provided with means to facilitate its rotation.

6. A collet chuck comprising a hollow body, means for attaching the body to a machine tool, a block longitudinally slidable in said body, said block having a longitudinal bore passing therethrough and a flange at its inner end constructed with a tapered orifice, a member in threaded engagement with the outer end of the body, said member having a flange constructed with a tapered orifice, a collet in the bore of the block interposed between the flange thereof and the flange of the member, said collet having tapered outer surfaces at its ends in engagement with the tapered orifices in said flanges, a pin passing transversely through the body and the block offset from the axis of the body and the block, to clear the longitudinal bore in the block said pin having end portions seated in circular openings in the body and an intermediate portion eccentric to its axis of rotation and being provided with means to facilitate its rotation.

7. A collet chuck comprising a hollow body, means for attaching the body to a machine tool, a block longitudinally slidable in said body, said block having a longitudinal bore passing therethrough, a slot in said block extending laterally from one side of the bore, said slot having flat sides normal to the axis of the bore in the block, a flange at the inner end of the block constructed with a tapered orifice, a member in threaded engagement with the outer end of the body, said member having a flange constructed with a tapered orifice, a collet in the bore of the block between the flange thereof and the flange of the member, said collet having tapered outer surfaces at its ends in engagement with the tapered orifices in said flanges, a cross head slidably fitted in the slot in said block, a cylindrical bore in said cross head normal to the bore in the block, a pin passing transversely through the body and the cross head and fitting the bore in said cross head offset from the axis of the body and the block, to clear the longitudinal bore in the block said pin having a portion eccentric to its axis of rotation and being provided with means to facilitate its rotation.

8. A collet chuck comprising a hollow body, means for attaching the body to a machine tool, a block longitudinally slidable in said body, said block having a longitudinal bore passing therethrough, and an inwardly projecting flange at its inner end, a member in threaded engagement with the outer end of the body, said member having an inwardly projecting flange at its outer end, at least one of said flanges having a tapered orifice, a collet in the bore of the block interposed between the flange thereof and the flange of the member, said collet having a tapered surface at at least one of its ends in engagement with the tapered orifice in one of the flanges, a pin passing transversely through the body and the block, offset from the axis of the body and the block to clear the longitudinal bore in the block, said pin having a portion eccentric to its axis of rotation and being provided with means to facilitate its rotation.

9. A collet chuck comprising a hollow body, means for attaching the body to a machine tool, a block longitudinally slidable in said body, said block having a longitudinal bore passing therethrough, a slot in said block extending laterally from one side of the bore, said slot having flat sides normal to the axis of the bore in the block, an inwardly projecting flange at the inner end of the block, a member in threaded engagement with the outer end of the body, said member having an inwardly projecting flange at its outer end, at least one of said flanges having a tapered orifice, a collet in the bore of the block interposed between the flange thereof and the flange of the member, said collet having a tapered surface at at least one of its ends in engagement with the tapered orifice in one of the flanges, a cross head slidably fitted in the slot in said block, a cylindrical bore in said cross head normal to the bore in the block, a pin passing transversely through the body and the cross head and fitting the bore in said cross head, offset from the axis of the body and the block to clear the longitudinal bore in the block, said pin having a portion eccentric to its axis of rotation and being provided with means to facilitate its rotation.

10. A collet chuck comprising a hollow body, means for attaching the body to a machine tool, a block longitudinally slidable in said body said block having a longitudinal bore, a transverse slot in said block having flat sides normal to the axis of the bore in the block, a flange at the inner end of the block constructed with a tapered seat, a member in adjustable threaded engagement with the outer end of the body, said member having a flange constructed with a tapered orifice, a tubular collet in the bore of the block between said flanges, said collet having oppositely tapered outer surfaces at its ends in engagement with the tapered portions of said flanges, a cross head slidably fitted in the slot in said block, a cylindrical bore in said cross head normal to the bore in the block, and a pin passing transversely through the body and the cross head said pin having end portions rotatively seated in circular pockets in the body and an intermediate eccentric portion fitting the bore in said cross head, and being provided with means to facilitate its rotation.

11. A collet chuck comprising a hollow body, means for attaching the body to a machine tool, a block longitudinally slidable in said body, a transverse slot in said block having flat sides normal to the axis of the bore in the block, a tapered seat formed in the block, a member in adjustable threaded engagement with the outer end of the body, said member having a flange constructed with a tapered orifice, a collet having oppositely tapered outer surfaces at its ends in engagement with the tapered seat in the block and the tapered orifice in the flange, a cross head slidably fitted in the slot in said block, a cylindrical bore in said cross head normal to the bore in the block, and a pin passing transversely through the body and the cross head, said pin having end portions rotatively seated in circular pockets in the body and an intermediate eccentric portion fitting the bore in said cross head, and being provided with means to facilitate its rotation.

ARTHUR MERRICK STONER.